United States Patent

Ogata

[11] Patent Number: 6,113,861
[45] Date of Patent: Sep. 5, 2000

[54] PHOTOCATALYST SHEET

[75] Inventor: Shiro Ogata, Kawasaki, Japan

[73] Assignee: TAO, Inc., Tokyo, Japan

[21] Appl. No.: 09/029,393

[22] PCT Filed: Jun. 27, 1997

[86] PCT No.: PCT/JP97/02242

§ 371 Date: Feb. 27, 1998

§ 102(e) Date: Feb. 27, 1998

[87] PCT Pub. No.: WO98/00290

PCT Pub. Date: Jan. 8, 1998

[30] Foreign Application Priority Data

Jul. 2, 1996 [JP] Japan .................................. 8-192807

[51] Int. Cl.$^7$ ...................................................... A61L 9/16
[52] U.S. Cl. ........................... 422/122; 428/372; 428/384; 428/394; 422/121
[58] Field of Search .............................. 422/24, 120, 122, 422/121; 428/372, 384, 394

[56] References Cited

FOREIGN PATENT DOCUMENTS

| 7-316342 | 12/1995 | Japan . |
| 8-266902 | 10/1996 | Japan . |
| 9-75633 | 3/1997 | Japan . |
| 9-78454 | 3/1997 | Japan . |

*Primary Examiner*—Elizabeth McKane
*Attorney, Agent, or Firm*—Staas & Halsey, LLP

[57] ABSTRACT

A photocatalytic sheet which has a base made of polymeric organic compound, that is not decomposed by a photocatalytic function, and also hardly loses the photocatalytic function after washing and is capable of providing the photocatalytic function even in an environment without sufficient ultraviolet radiation from outside. Using a fiber, a filament, a yarn made of fibers or filaments, a ribbon, a knitted fabric, a woven fabric, a nonwoven fabric, or a film as the base, a base protective layer is formed on a part of the base, which is made of the polymeric organic compound, and a photocatalytic semiconductor layer is formed on the entire surface of the base including the base protective layer.

8 Claims, 3 Drawing Sheets

PHOTOCATALYST SHEET

TECHNICAL FIELD

The present invention relates to a sheet of knitted fabric, woven fabric, nonwoven fabric, etc., which is capable of decomposing harmful organic compounds in gas or liquid by a photocatalytic function of metal oxide, and thereby rendering the gas or liquid harmless or sterilizing the same.

BACKGROUND ART

Many metal oxides such as titanium oxide ($TiO_2$) are called optical semiconductors since electrons on their surface are made movable relatively freely when they are excited by ultraviolet rays. The optical semiconductor has a photocatalytic function of oxidizing or deoxidizing a substance in contact with a surface of the semiconductor by the electrons which are rendered freely movable by the excitation.

The photocatalytic function is utilized in a daily life to attain an effect of deodorization or sterilization. For example, in order to purify the air in a room of a house or facilities open to general public such as hotels, public buildings and hospitals, the photocatalytic function is given to materials of interiors including ceilings and walls, or the photocatalytic semiconductor is retained in curtains which are often exposed to ultraviolet radiation of the sunlight. Thus, the air which rises to circulate in the room when heated by the sunlight comes into contact with sheets of these materials, so that odors in the room and volatile organic compounds (VOC) contained in adhesives in backings of the interior materials are effectively removed.

The woven fabrics for the interior materials and the curtains, as well as filters in various devices, medical gauze, moistened tissue and nonwoven fabrics such as artificial leather have a large number of gaps between their fibers and thus are multi-surface objects, and hygienic, medical or deodorizing effect can advantageously be obtained by imparting the photocatalytic function to these objects.

These advantageous effects can be achieved on condition that the fiber or fabric itself, which is a base for retaining the photocatalytic semiconductor, should not be decomposed by the photocatalytic function. However, the photocatalytic function is originally a function of decomposing the polymeric organic compounds by the oxidization/deoxidization action of the photocatalytic semiconductor which is excited by irradiation of ultraviolet rays. Therefore, no problem arises if the base retaining the photocatalytic semiconductor is made of an inorganic material such as metallic fibers or glass fibers, but in the case where the base is made of fibers of polymeric organic compound such as natural fibers or synthetic resin fibers, the base itself is decomposed and deteriorated with lapse of time (deterioration by photocatalysis).

Further, polymeric organic compounds are decomposed and deteriorated also by ultraviolet rays (photochemical deterioration). Most of the external ultraviolet rays falling on the base having the photocatalytic semiconductor layer on the surface thereof are absorbed at the photocatalytic semiconductor layer, but the remaining rays reach the base.

As a conventional sheet having the photocatalytic function, there is known a sheet in which particles of white pigment, each retaining particles of photocatalytic semiconductor on its surface, are contained or filled in an air-permeable sheet as proposed in Japanese Laid-Open Patent Publication No. 7-299354. However, this sheet with a unique structure lacks versatility and it is not possible to make a soft material such as gauze by using the sheet.

Japanese Laid-Open Patent Publication No. 7-316342 discloses that synthetic resin containing particles of photocatalytic semiconductor is formed into a sheet for wall materials, floor materials, and various bags. However, when the photocatalytic semiconductor particles are thus kneaded into the base, the photocatalytic function cannot be fully achieved. Also, the technique disclosed in this publication cannot be applied to fabric made of natural fibers which cannot be kneaded.

Further, Japanese Laid-Open Patent Publication No. 8-1010 discloses an adhesive sheet having a layer of fine particles of oxide semiconductor on one surface thereof, an adhesive layer as an intermediate layer, and a separating layer on the other surface thereof. This sheet is intended to use at locations where it is difficult to fix photocatalytic semiconductor particles, such as walls or ceilings, and also cannot be applied to soft material such as gauze.

In the conventional sheets of these types, no consideration is given to prevention or suppression of the deterioration by photocatalysis and the photochemical deterioration. Also, the washability of the sheet for reuse and the use of the sheet in an environment without sufficient ultraviolet radiation, such as in the nighttime or in a dark room, are not taken into account.

DISCLOSURE OF INVENTION

An object of the present invention is providing a photocatalytic sheet which has a base, made of polymeric organic compound and retaining photocatalytic semiconductor, that is not decomposed by a photocatalytic function, and thus can withstand long-term use. The object includes providing a photocatalytic sheet which hardly loses the photocatalytic function even if washed, and is capable of providing the photocatalytic function even in an environment without sufficient ultraviolet radiation from outside.

A photocatalytic sheet according to the present invention comprises a base having a part made of polymeric organic compound; a base protective layer formed on a surface of the part made of polymeric organic compound in the base, for intercepting photocatalytic function; and a photocatalytic semiconductor layer formed on an entire surface of the base including said base protective layer.

The base includes a fiber, a filament, a yarn made of fibers or filaments, a ribbon, a knitted fabric, a woven fabric, a nonwoven fabric, and a film made of synthetic resin.

The base protective layer may comprise noncrystalline titanium peroxide particles or titanium oxide particles inactivated with respect to photocatalytic function. The photocatalytic semiconductor layer may comprise constituted by titanium oxide particles.

The base may retain a spontaneous emission-type ultraviolet radiating material or a light storage-type ultraviolet radiating material. In this case, the compositions of the ultraviolet radiating material and the photocatalytic semiconductor layer are adjusted so that a peak region of wavelength spectrum of light radiated from the ultraviolet radiating material is shifted from a peak region of wavelength spectrum of light to be absorbed by the polymeric organic compound, and overlaps at least in part with a peak region of light absorption spectrum of the photocatalytic semiconductor layer.

BEST MODE OF CARRYING OUT THE INVENTION

Figure 1:
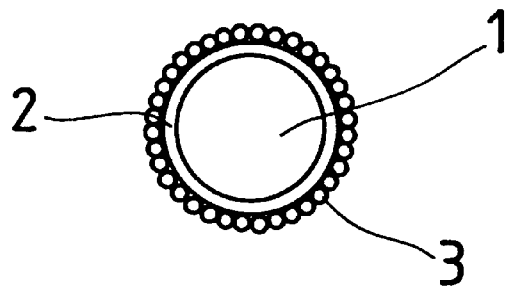
FIG. 1 is a sectional view of a fiber having a base protective layer and a photocatalytic semiconductor layer formed on a base.

A photocatalytic sheet according to the present invention may take the form of a knitted fabric, a woven fabric, a nonwoven fabric, or a film. The material of the sheet may be natural fibers such as hemp, cotton and wool, and also synthetic fibers (including filaments) or synthetic resin of polyester, rayon, nylon, polypropylene, vinyl, acetate, acrylic, etc. The sheet except the film is formed through the steps of fibers, spun yarns, twisted yarns, or ribbons.

Also, metallic fibers or glass fibers may be used, and a single sheet may be formed using a plurality of materials. Depending on the use of the sheet, moreover, paper or artificial leather may be used. The sheet needs to have a decorative element and sufficient strength when used for the purposes of interior materials or accessories, and needs to have flexibility for clothing or hygienic purposes.

A base protective layer is constituted by a layer of noncrystalline titanium peroxide particles formed using an aqueous solution of titanium peroxide, a peroxotitanic acid, a peroxotitanic acid containing an oxide of metal other than titanium, etc., or by a layer of titanium oxide particles inactivated in respect of photocatalytic function. The layer obtained in this manner has no photocatalytic function and thus does not decompose the base.

The layer of noncrystalline titanium peroxide particles can be formed on the surface of the base in the following manner, for example.

A fabric as the base which has been subjected to dyeing as a final step is sprayed with or dipped into an aqueous solution of titanium peroxide showing an intermediate property between sol and gel states, and after surplus solution is removed, the fabric is dried and then heated so as to fix the titanium peroxide at a temperature of 200° C. or less, taking the heat resisting temperature of the base into consideration.

The surface of the base may alternatively be coated with an aqueous solution of peroxotitanic acid by, for example, dipping as in the aforementioned manner, dried and then heated for fixing at a temperature of 200° C. or less.

In this manner, a layer of noncrystalline titanium peroxide particles is formed on the surface of the base.

In the case of using peroxotitanic acid, if the heating temperature is higher than 200° C., the resultant noncrystalline titanium peroxide particles show a property similar to that of titanium oxide of anatase type and have a photocatalytic function.

As an alternative method, a raw resin for forming fibers as the base may be ejected from a nozzle into an aqueous solution of peroxotitanic acid so that a thin film of noncrystalline titanium peroxide particles may be formed on the surface of each fiber. Also in this case, the fibers are dried and then heated so as to fix the titanium peroxide at a temperature of 200° C. or less. The fixing may be performed after spinning, after twisting, or after weaving.

The layer of titanium oxide inactivated in respect of the photocatalytic function may be formed on the surface of the base in the following manner, for example.

An ionic surface-active agent is mixed in a sol of titanium oxide of anatase type such that the surface-active agent accounts for 1 wt % or more with respect to the concentration of the titanium oxide ($TiO_2$) in the sol, thereby inactivating the photocatalytic function of the titanium oxide, and then the base is sprayed with, dipped into, or applied with the sol. Subsequently, the base is dried and then heated for fixing the titanium oxide.

A photocatalytic semiconductor layer is formed on the surface of the base treated in this manner, and in this case, even if the photocatalytic semiconductor is excited upon exposure to ultraviolet radiation, electrons moving toward the surface of the base combine with ions of the ionic surface-active agent contained in the base protective layer, thus preventing oxidation-reduction of the surface of the base. Consequently, the base is not affected by the photocatalytic function and thus can be protected.

The base on which the photocatalytic semiconductor is to be retained is not limited to the form of knitted fabric, woven fabric, nonwoven fabric or film, but may be of various forms obtained in respective steps of the sheet production process, such as fibers, spun yarns, twisted yarns, or ribbons. Particles of photocatalytic semiconductor may be affixed at early stages of the process to fibers or yarns, for example, on condition that no difficulty arises in performing the treatment, in which case the photocatalytic semiconductor is firmly fixed to the resultant sheet and the photocatalytic function can be retained even if the sheet is washed several times.

Namely, as the base retaining photocatalytic semiconductor for imparting the photocatalytic function to the sheet, one or some of the forms including fiber, filament, yarn, ribbon, knitted fabric, woven fabric, nonwoven fabric and film may be selected depending on the purpose.

The layer of noncrystalline titanium peroxide particles or the layer of inactivated titanium oxide needs to be formed on natural fibers or synthetic resin fibers. Therefore, in cases where inorganic fibers and organic fibers cannot be treated separately, as in producing a filter of nonwoven fabric by entangling glass fibers and synthetic resin fibers, it is advisable to treat the fibers as the base, that is, to perform the step of forming the base protective layer on the fibers, and then form the fibers into nonwoven fabric. Alternatively, however, after a nonwoven fabric is formed, it may be subjected in its entirety to the step of forming the base protective layer.

The photocatalytic semiconductor to be used may be $TiO_2$, $ZnO$, $SrTiO_3$, $CdS$, $CdO$, $CaP$, $InP$, $In_2O_3$, $CaAs$, $BaTiO_3$, $K_2NbO_3$, $Fe_2O_3$, $Ta_2O_5$, $WO_3$, $SaO_2$, $Bi_2O_3$, $NiO$, $CU_2O$, $SiC$, $SiO_2$, $MoS_2$, $MoS_3$, $InPb$, $RuO_2$, or $CeO_2$.

These photocatalytic semiconductors absorb ultraviolet radiation with a wavelength of 50 to 400 nm, which is slightly shorter than that of visible light. Some of the photocatalytic semiconductors, however, have an absorption wavelength falling within the range of visible light. For example, SiC has an absorption wavelength of 413 nm, CdS has an absorption wavelength of 496 nm, and $Fe_2O_3$ has an absorptionwavelength of 539 nm.

Thus, the wavelength of light with which photocatalytic semiconductors are excited varies depending on their type, and therefore, a suitable photocatalytic semiconductor may be selected in accordance with the intended use or the emission spectrum characteristic of the source of ultraviolet radiation, or multiple types of photocatalytic semiconductors may be used in combination for adjustment.

Also, by adding an inorganic pigment or a metal to thereby adjust the composition or by controlling the heating step in the production process, it is possible to shift the wavelength of ultraviolet radiation (absorption band) that is required to provide the photocatalytic function. For example, if a small quantity of $CrO_3$ is added to $TiO_2$, then the absorption band shifts toward a longer wavelength side.

As an additive for providing a complementary function such as mildew resistance, sterilization, etc., Pt, Ag, Rh, $RuO_2$, Nb, Cu, Sn, NiO and the like may be used in combination.

Among the photocatalytic semiconductors mentioned above, $TiO_2$ (titanium oxide) is commercially available, harmless to the human body, inexpensive, and easy to use. "ST-01" (trade name; manufactured by Ishihara Sangyo Kaisha, Ltd.) is supplied in the form of powder, while "TO SOL" (trade name; manufactured by Tanaka Transfer Printing Co., Ltd.) and "STS-01" (trade name; manufactured by Ishihara Sangyo Kaisha, Ltd.) are supplied in the form of sol. $TiO_2$ constituting the powder or sol has a very small particle diameter of 7 to 20 nm.

To fix the photocatalytic semiconductor on the base, various means such as spraying, applying, dipping or sputtering can be employed, and a suitable means may be selected depending on the base type. However, since the sheet to be obtained is required to withstand reuse or washing, the base with the photocatalytic semiconductor thereon is subjected to heat treatment. In the case of $TiO_2$, the temperature for the fixing ranges relatively wide from 50 to 500° C., but in the case of using peroxotitanic acid as the base protective layer, the fixing is performed at a temperature of 200° C. or less. As regards the heat resistance of fibers presently on the market, rayon, acetate, nylon and polyester have heat resisting temperatures of 260° C. or less, 200° C. or less, 180° C. or less, and 230° C. or less, respectively, and thus can sufficiently withstand coating with heat applied thereto.

With the photocatalytic sheet produced in this manner, as ultraviolet rays from fluorescent lamps in the room or ultraviolet rays in the sunlight are received, the photocatalytic semiconductor retained on the sheet is excited and decomposes harmful organic matter by means of oxidation-reduction, thus providing a deodorizing effect, an air purifying effect, a sterilizing effect, etc.

Especially in the case where the sheet is used as a curtain which is arranged at an opening and is liable to receive the sunlight, the air in the room, which rises and circulates within the room as it is heated, efficiently comes into contact with the photocatalytic semiconductor, whereby odor in the room and volatile organic compounds (VOC) contained in building materials, adhesives, etc. can be removed.

Also, where the sheet is used for medical articles such as sterilizing gauze or is used for sanitary articles such as moistened tissue, infections can be effectively prevented.

The base may retain also an ultraviolet radiating material. With a photocatalytic sheet having an ultraviolet radiating material mixed in the base, ultraviolet rays necessary for exciting the photocatalytic semiconductor are supplied by the photocatalytic sheet per se, so that the photocatalytic function can be obtained and maintained even while no or only little ultraviolet radiation is available from outside, such as in the nighttime or within doors.

Ultraviolet radiating materials include a spontaneous emission type and a light storage type. The spontaneous emission-type ultraviolet radiating material (spontaneous emission-type luminous ceramic) is a material that consumes its internal energy to emit light by itself and utilizes radioactive decay of radium or promethium, and an emission spectrum thereof includes an ultraviolet region. Presently, a lump obtained by solidifying refined powder of rocks containing such a material is again crushed and the thus-obtained crushed particles are used. The particle diameter is 20 to 50 µm.

The light storage-type ultraviolet radiating material (light storage-type luminous ceramic) is a material that obtains energy from outside and emits light by releasing the energy stored therein, and an emission spectrum thereof includes an ultraviolet region. As such a material, "LUMINOVA" (trade name; manufactured by Nemoto & Company Ltd.) and "KEPRUS" (trade name; manufactured by Next Eye Co., Ltd.) are commercially available. These products contain strontium aluminate ($SrAl_2O_4$) as a main component, besides high-purity alumina, strontium carbonate, europium, dysprosium, etc.

If the light storage-type ultraviolet radiating material is exposed to sufficiently intense ultraviolet rays from outside for 4 to 30 minutes, absorption of external energy for light emission becomes saturated, and even if the supply of external energy is cut off thereafter, the material keeps emitting light for about 1000 minutes, thus irradiating the photocatalytic semiconductor with ultraviolet rays. In the case of "LUMINOVA," for example, the spectrum of emitted ultraviolet rays has a wavelength peak in the vicinity of 440 to 530 nm, but includes also a wavelength region in which ordinary photocatalytic semiconductors are excited.

Some of the ultraviolet radiating materials greatly lower in capacity on absorbing moisture; therefore, they are preferably mixed beforehand in the base so that they may not come into direct contact with moisture, on condition that the base has transparency to ultraviolet radiation. In the case where natural fibers are used, synthetic resin admixed with the ultraviolet radiating material is sprayed on the base for coating before the base protective layer is formed.

The ultraviolet radiating material is retained on the sheet chiefly by means of adhesion or fixing to the surface of the base, but in the case of synthetic resin fibers or a synthetic resin film, the ultraviolet radiating material may be mixed in the base. Also, where the fibers used are synthetic resin filaments, the ultraviolet radiating material may be mixed in some of radially segmented regions as viewed in section, or be mixed in ring form so as to constitute the outermost layer as viewed in section.

Such filaments are produced by extruding a raw resin mixed with the ultraviolet radiating material and a raw resin having no ultraviolet radiating material mixed therein from separate nozzles into the air or a cooling liquid such as organic solvent, water or the like, and bringing the extruded resins into close contact with each other before they set.

In the case of natural fibers, particles of the ultraviolet radiating material cannot be mixed in the fibers themselves; therefore, in the step of twisting yarns, the natural fibers and synthetic resin fibers admixed with the ultraviolet radiating material are twisted together.

The base is subject to photocatalytic deterioration caused due to the photocatalytic function of the photocatalytic semiconductor as well as to photochemical deterioration caused by ultraviolet rays, as mentioned above. Suppression of the photocatalytic deterioration is already stated above.

The photochemical deterioration is suppressed by utilizing the fact that resins are different from one another as to the rate of photochemical deterioration and the wavelength with which they are most liable to be deteriorated. In typical synthetic resins, the wavelength that causes the greatest deterioration is 318 nm for polyester, 300 nm for polyproplylene, 285 to 305 nm and 330 to 360 nm for polycarbonate, and 300 nm for polyethylene.

Namely, to prevent the photochemical deterioration, an ultraviolet radiating material is selected of which the peak of emission wavelength spectrum differs from the wavelength that causes the greatest deterioration of the resin used. Also, the excitation wavelength of the photocatalytic semiconductor retained on the base is made different from the wavelength which causes the greatest deterioration of the synthetic resin. Needless to say, the addition of an ultraviolet ray absorbing material, such as 2-hydroxybenzophene or triazole, to the base is effective in preventing the photochemical deterioration.

The photocatalytic sheet according to the present invention will be now described with reference to specific examples.

EXAMPLE 1

Using, as a base, a nonwoven fabric (4880C, from Shinwa Co. Ltd.) obtained by bonding polyester fibers and rayon fibers together by an acrylic binder, the base was first washed in tap water and then in pure water, and was dried at 70° C. Subsequently, the base was dipped into a sol of titanium peroxide (viscous sol containing 0.3 wt % $TiO_3$ and having pH 5) at room temperature (23.8° C.), and after surplus sol was removed, the base was placed in a space in which titanium oxide powder (ST-01, from Ishihara Sangyo Kaisha, Ltd.) was floating, to allow titanium oxide particles to adhere to the entire surface of the base, followed by drying.

The base obtained in this manner was then half-dried in an atmosphere of 50° C., and the entire surface thereof was ironed at 120 to 150° C. to fix the titanium oxide particles, thereby obtaining a final product.

The final product was light yellowish white in color as a whole, and although the gaps between the fibers constituting the nonwoven fabric were slightly clogged, the external appearance looked almost the same as that before the treatment. FIG. 1 is a schematic enlarged sectional view of a fiber constituting the fabric. As shown in the figure, the base protective layer 2 constituted by a layer of noncrystalline titanium peroxide particles is formed on the surface of the fiber 1 located at the center, and the photocatalytic semiconductor layer 3 is formed on the surface of the base protective layer 2.

The final product was placed like wallpaper in the space of an ordinary room, and after the product was left to stand for two months, the product was pulled lengthwise and widthwise and was bent, but no abnormality was found as to strength and other properties. This experiment is being continued on a long-term basis, to observe deterioration of the base (photocatalytic deterioration and photochemical deterioration).

The oxidation-reduction capacity is summarized hereinafter as experimental results.

EXAMPLE 2

Using, as a base, a woven fabric (DEOLIA; from Nippon Fisba K. K.) made of mixed fibers containing 50% cotton and 50% polyester, the base was first washed in tap water and then in pure water, and was dried at 70° C., as in Example 1. Subsequently, the base was dipped into a sol of titanium peroxide (sol containing 0.5 wt % $TiO_3$ and having pH 6.4) at room temperature (23.8° C.), and after surplus sol was removed, the base was placed in a space in which titanium oxide powder (ST-01; from Ishihara Sangyo Kaisha, Ltd.) was floating, to allow titanium oxide particles to adhere to the entire surface of the woven fabric, followed by drying.

The base obtained in this manner was then half-dried in an atmosphere of 50° C., and the entire surface thereof was ironed at 120 to 150° C. to fix the titanium oxide particles, thereby obtaining a final product.

Each fiber had a cross section similar to that shown in the schematic diagram of FIG. 1.

The final product was light yellowish white in color as a whole, and the external appearance thereof looked almost the same as that before the treatment. The final product was placed like wallpaper in the space of an ordinary room, and after the product was left to stand for two months, the product was pulled lengthwise and widthwise and was bent, but no abnormality was found as to strength and other properties. This experiment is being continued on a long-term basis, to observe deterioration of the base (photocatalytic deterioration and photochemical deterioration).

The oxidation-reduction capacity is summarized hereinafter as experimental results.

EXAMPLE 3

Using a woven fabric (DUFY; from Nippon Fisba K. K.) of 100% cotton as a base, the base was first washed in tap water and then in pure water, and was dried at 70° C., as in Example 1. Subsequently, the base was dipped into a mixture of a sol of titanium peroxide (sol containing 1.76 wt % $TiO_3$ and having pH 6.0) and a sol of titanium oxide (TO from Tanaka Transfer Printing Co., Ltd.; 3.94 wt % titanium oxide; pH 8.1) at room temperature (23.8° C.). After surplus sol was removed, the base was dried in an atmosphere of 50° C.

In this case, a layer constituted by a mixture of titanium peroxide particles and titanium oxide particles is formed on the surface of each fiber; since the sol of titanium peroxide has more excellent spreadability with respect to the surface of the fiber, a layer of titanium peroxide particles is formed near the surface of the fiber while a layer of titanium oxide is formed on the outermost side. Although the available photocatalytic capacity is somewhat low, it is unnecessary to perform an additional step for the adhesion of titanium oxide powder.

Subsequently, the entire surface of the base was ironed at 120 to 150° C. to fix the layer of titanium oxide particles and titanium peroxide particles, thereby obtaining a final product.

The external appearance of the final product was almost the same as that before the treatment. The final product was placed like wallpaper in the space of an ordinary room, and after the product was left to stand for two months, the product was pulled lengthwise and widthwise and was bent, but no abnormality was found as to strength and other properties. This experiment is still being continued to observe deterioration of the base (photocatalytic deterioration and photochemical deterioration) on a long-term basis.

The oxidation-reduction capacity is summarized hereinafter as experimental results.

Figure 2:
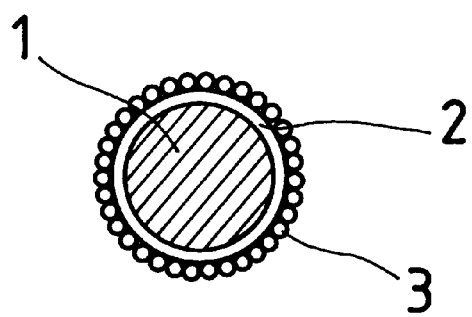
FIG. 2 is a sectional view of a fiber having the base protective layer and the photocatalytic semiconductor layer formed on a base containing an ultraviolet radiating material.
Figure 3:
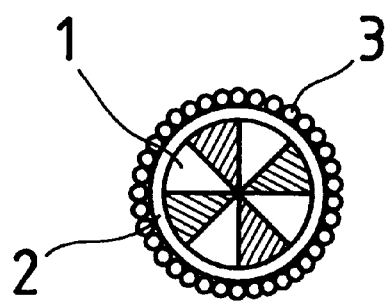
FIG. 3 is a sectional view of a fiber having the base protective layer and the photocatalytic semiconductor layer formed on a base in which regions containing the ultraviolet radiating material are arranged radially.
Figure 4:
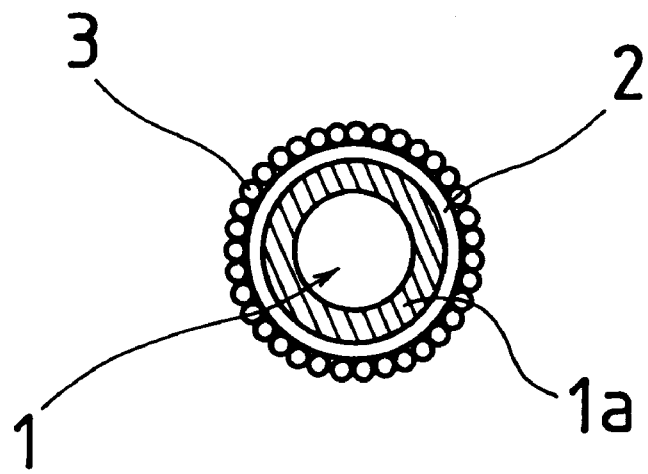
FIG. 4 is a sectional view of a fiber having the base protective layer and the photocatalytic semiconductor layer formed on a base in which a region containing the ultraviolet radiating material is arranged annularly.

FIGS. 2 to 4 each show an example wherein "LUMINOVA" as the light storage-type ultraviolet radiating material is mixed in a polyester fiber 1, in accordance with Examples 1 to 3 described above. In the example of FIG. 2, the ultraviolet radiating material is mixed in the whole of the fiber 1, in the example of FIG. 3, the ultraviolet radiating material is mixed in a plurality of radially segmented regions of the fiber as viewed in section, and in the example of FIG. 4, the ultraviolet radiating material is mixed in ring form 1*a* to constitute the outermost layer of the fiber as viewed in section. In the figures, hatching represents regions in which the ultraviolet radiating material is mixed, reference numeral 1 denotes the fiber, 2 denotes the base protective layer, and 3 denotes the layer of photocatalytic semiconductor particles.

The peak wavelength of light that the polyester fiber absorbs is at 318 nm, and accordingly, the peak wavelength of light that the layer of titanium oxide particles absorbs is adjusted to 480 nm. The wavelength band of light that "LUMINOVA" radiates is, on the other hand, adjusted to 440 to 530 nm.

Figure 5:
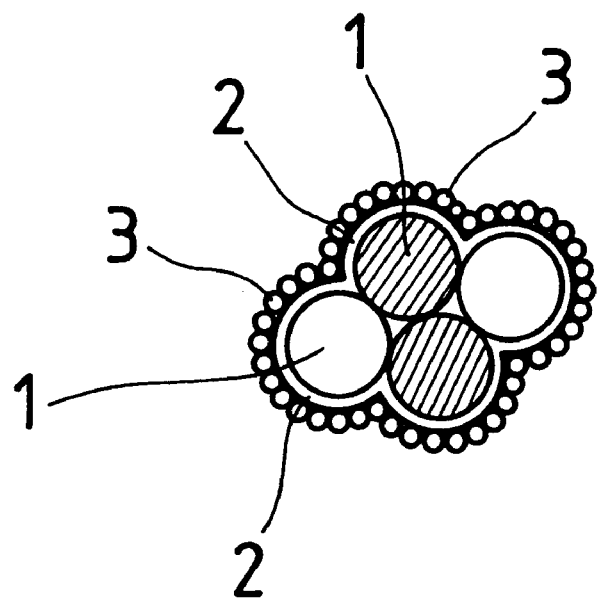
FIG. 5 is a sectional view of a twisted yarn having the base protective layer and the photocatalytic semiconductor layer formed on natural fibers, and synthetic fibers admixed with an ultraviolet radiating material.

FIG. 5 is a sectional view of a twisted yarn constituted by natural fibers and synthetic resin fibers admixed with the ultraviolet radiating material, and illustrates a means of imparting light storage capacity to a woven fabric using natural fibers.

The following describes the experimental results as to the effect of the photocatalytic function observed when the photocatalytic sheets obtained according to Examples 1 and 2 were irradiated with ultraviolet rays.

[Prepared Sheets] (size: 10×cm)

a. Woven fabric "DUFY" (100% cotton) treated according to Example 2.
b. Woven fabric "DEOLIA" (50% cotton and 50% polyester) treated according to Example 2.
c. Nonwoven fabric "4880C" (polyester and rayon with acrylic binder) treated according to Example 1.
d. Nonwoven fabric "7870" (polyester; manufactured by Shinwa Co. Ltd.) treated according to Example 1.
e. Nonwoven fabric "7330GP" (polyester and rayon; manufactured by Shinwa Co. Ltd.) treated according to Example 1.
f. Nonwoven fabric "7230CG" (cotton; manufactured by Shinwa Co. Ltd.) treated according to Example 1.

[Experimental Device]

Six small vessels made of polypropylene (each having a square receiving portion of 14×14×3 cm).

A large vessel made of float glass (having a rectangular receiving portion of 62×42×42 cm and a cover made of float glass).

Two black-light lamps (20 W).

A required amount of colored water [POLLUX BLUE (PM-1); from Sumika Color Co., Ltd.], a nonionic 0.04% solution having pH 5.5 to 6.5 and containing 0.014% active ingredient.

[Experimental Procedure]

Figure 6:
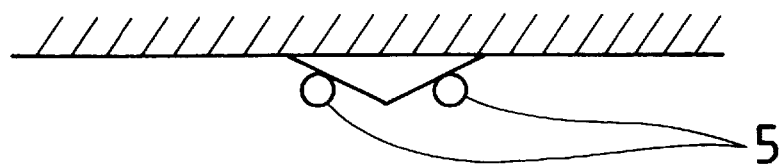
FIG. 6 is a schematic front view of an experimental device.
Figure 6:
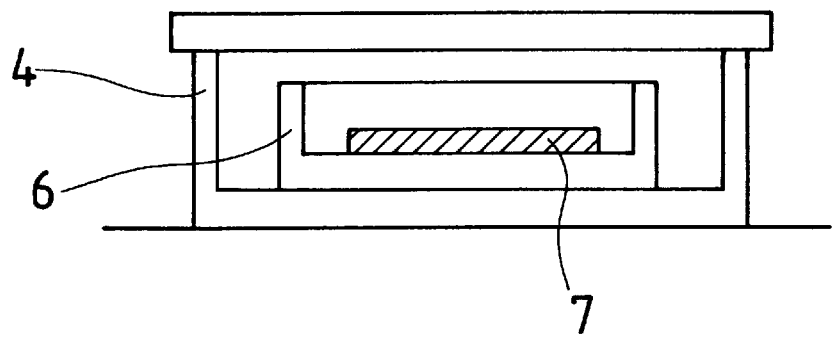
Figure 7:
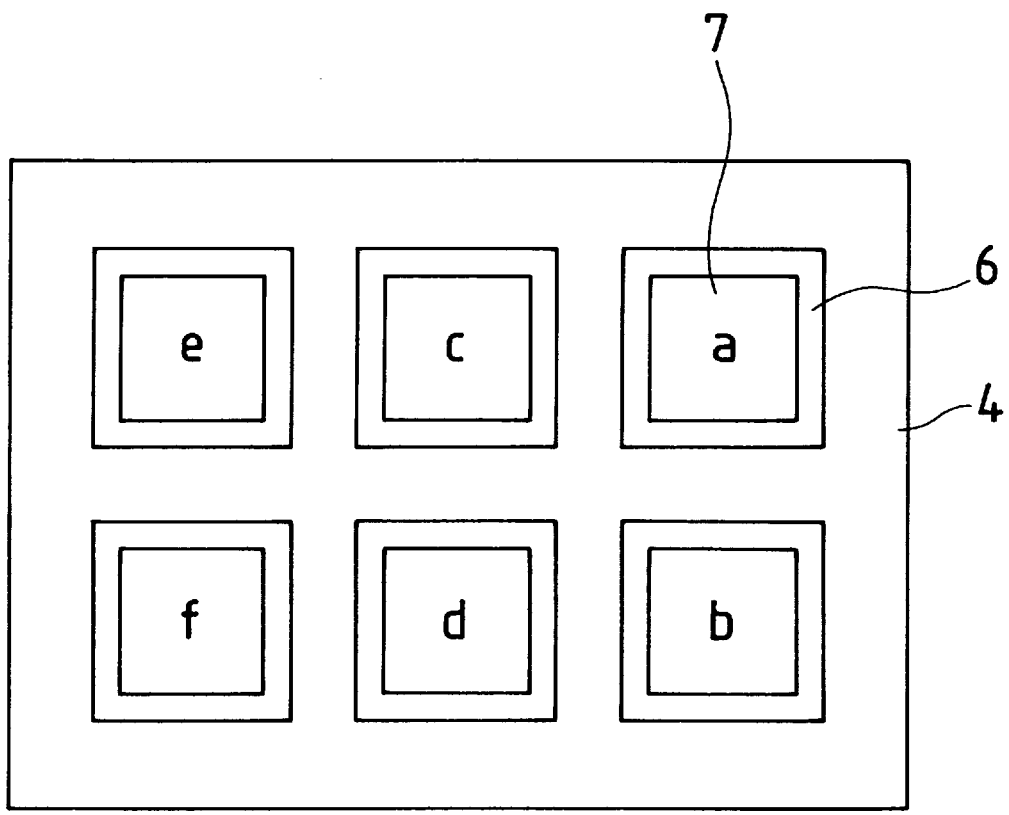
FIG. 7 is a schematic plan view of the experimental device of FIG. 6 with black-light lamps omitted.

As shown in FIGS. 6 and 7, the large vessel 4 was placed on a desk, and the black-light lamps 5 were horizontally arranged immediately above the vessel at a distance of 70 mm from the top face of the desk. The six small vessels 6 were arranged inside the large vessel 4 at regular intervals, and the sheets 7 prepared as mentioned above were placed in the respective small vessels. Then, 50 cc of the colored water was poured into each of the small vessels 6. With the large vessel 4 closed with the cover, the vessels and the sheets were left to stand at room temperature, and change in color of the colored water in the individual small vessels was observed from outside.

POLUX BLUE is a pigment of polymeric organic compound and is decomposed by the photocatalytic function of the photocatalytic semiconductor, so that it loses the function of coloring the solution. It is therefore possible to know the degree of progress of the oxidation-reduction caused by the photocatalytic function as well as the strength of the photocatalytic function.

[Results]

| First Testing | |
|---|---|
| Elapsed Time | Status |
| 2 hours | No change was observed. |
| 4 hours | Decomposition product of the coloring matter deposited on the bottom was observed, and the coloring of each small vessel was obviously lightened. |
| 6 hours | No particular change was observed. |
| 8 hours | The coloring of the small vessels in which Sheets a and b had been placed appeared to be slightly lighter than that of the other small vessels. |
| 10 hours | The coloring of the small vessels in which Sheets a and b had been placed was obviously lighter than that of the other small vessels. The coloring of Specimens c and d was the second lightest. |
| 24 hours | Almost no coloring was observed in respect of the liquid in the small vessels in which Sheets a and b had been placed. For Specimens a and b, all POLUX BLUE was judged to be decomposed, and thus decomposition was completed. For the other specimens, slight coloring was observed. The coloring of Specimen e was darker than that of Specimen f. |
| 26 hours | The liquid in all small vessels became colorless. For all specimens, decomposition was completed. |

Second Testing

The sheets a to f used in the first testing were washed, and experiment was conducted following the same procedure. In this case, 50 cc of POLUX BLUE colored liquid was poured afresh into each of the small vessels.

| Elapsed Time | Status |
|---|---|
| 2 hours | Decomposition considerably advanced. For Specimens a, b and c, deposit was observed, revealing that the photocatalytic function was not deteriorated even after the washing. |
| 21 hours | The liquid in all small vessels became colorless, and thus decomposition of POLUX BLUE was completed. |

Third Testing

The sheets b, e and f used in the second testing were again washed, 50 cc of POLUX BLUE colored liquid was poured afresh into each small vessel, and experiment was conducted again following the same procedure. The small vessels contained in the large vessel were three in number.

| Elapsed Time | Status |
|---|---|
| 2 hours | The degree of coloring of all small vessels was found to be small, but the change observed could not be called large. |
| 6 hours | For all of the small vessels, the degree of coloring was considerably small. The advance of decomposition appeared to be the same for all specimens. |
| 20 hours | For all of the small vessels, only slight coloring was observed. |
| 24 hours | No coloring was observed in respect of all small vessels, and thus decomposition was completed. |

The foregoing reveals that, although the sheets have different strengths of photocatalytic function, that is, (a, b)>(c, d)>f>e, they all exhibit sufficient oxidation-reduction effect.

According to the present invention, the protective layer constituted by noncrystalline titanium peroxide particles or inactivated titanium oxide particles is formed on the surface of the base. Accordingly, even if a photocatalytic semiconductor layer is formed on the surface of a base of natural fibers or synthetic resin fibers containing polymeric organic compound, the base is not decomposed by the photocatalytic function of the photocatalytic semiconductor, and thus is not deteriorated. Consequently, the sheet can be used for a long term as a photocatalytic sheet.

In the case where the base is admixed with an ultraviolet radiating material, moreover, the function of the photocatalytic sheet can be obtained even in a dark place where no ultraviolet rays reach. This capacity is useful when the sheet is used in filters or medical articles which are normally used at locations where ultraviolet rays are unlikely to reach. Also, since ultraviolet rays do not deteriorate the base containing polymeric organic compound, the photocatalytic sheet is improved in durability.

What is claimed is:

1. A photocatalytic sheet comprising:

a base having a part made of polymeric organic compound;

a base protective layer formed on a surface of said part made of polymeric organic compound in said base, for intercepting photocatalytic function; and a photocatalytic semiconductor layer formed on an entire surface of said base including said base protective layer.

2. A photocatalytic sheet according to claim 1, said base including a material selected from the group consisting of a fiber, a filament, a yarn made of fibers or filaments, a ribbon, a knitted fabric, a woven fabric, a nonwoven fabric, and a film made of synthetic resin.

3. A photocatalytic sheet according to claim 1, said base protective layer comprising noncrystalline titanium peroxide particles.

4. A photocatalytic sheet according to claim 1, said base protective layer comprising titanium oxide particles inactivated with respect to the photocatalytic function.

5. A photocatalytic sheet according to claim 1, said photocatalytic semiconductor layer comprising titanium oxide particles.

6. A photocatalytic sheet according to claim 1, said base retaining a spontaneous emission-type ultraviolet radiating material.

7. The photocatalytic sheet according to claim 6, wherein respective compositions of said ultraviolet radiating material and said photocatalytic semiconductor layer are adjusted so that a peak region of wavelength spectrum of light radiated from said ultraviolet radiating material is shifted from a peak region of wavelength spectrum of light to be absorbed by said polymeric organic compound, and overlaps at least in part with a peak region of light absorption spectrum of said photocatalytic semiconductor layer.

8. A photocatalytic sheet according to claim 1, said base retaining a light storage-type ultraviolet radiating material.

* * * * *